Patented July 2, 1929.

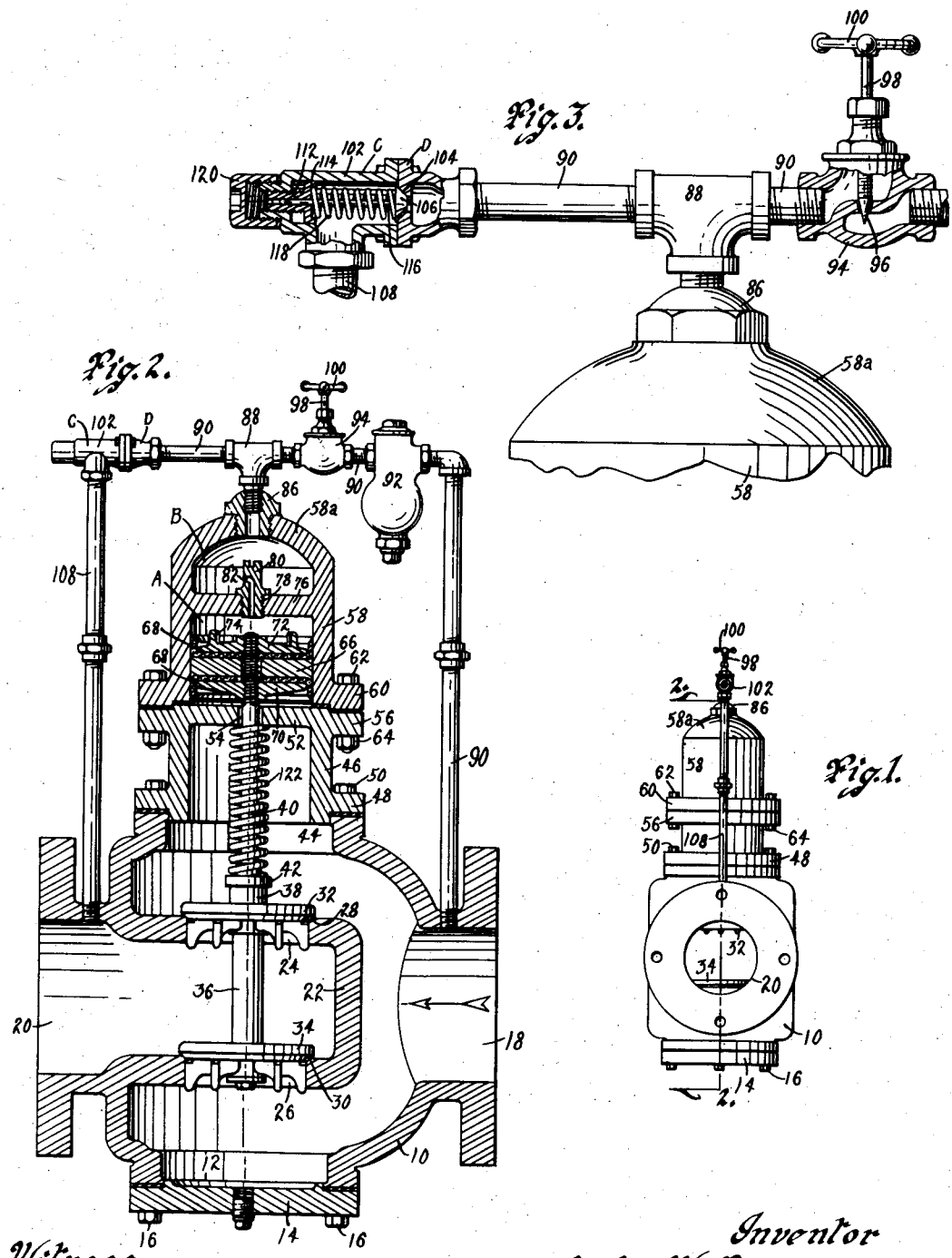

1,719,686

UNITED STATES PATENT OFFICE.

LYLE W. BROWNE, OF MARSHALLTOWN, IOWA, ASSIGNOR TO THE FISHER GOVERNOR COMPANY, INC., OF MARSHALLTOWN, IOWA.

RELIEF VALVE.

Application filed May 21, 1927. Serial No. 193,311.

The object of my invention is to provide a relief valve of simple, durable and inexpensive construction.

It is my special object to provide a relief valve for controlling the pressure on one side of the valve by relieving that pressure when it rises over a predetermined maximum and to afford a valve for this purpose with mechanism for its automatic control, whereby the valve will accurately operate and will be free from chattering or pounding.

With these and other objects in view, my invention consists in the construction, arrangement and combination of the various parts of my relief valve, whereby the objects contemplated are attained, as hereinafter more fully set forth, pointed out in my claims, and illustrated in the accompanying drawings, in which:

Figure 1 is an elevation of the valve as viewed from its discharge side.

Figure 2 is a detail, vertical, sectional view taken on the line 2—2 of Figure 1; and Figure 3 is an enlarged elevation of part of a valve control structure, parts being broken away and parts being shown in section.

In the drawings herewith, the reference numeral 10 has been used to indicate a valve body or casing having in its base or lower part the opening 12, which is ordinarily closed by the blind flange or plate 14. The blind flange or plate 14 is secured to the valve body 10 by means of bolts or cap screws 16.

The valve body has the inlet passage 18 and the outlet passage 20.

In the body is arranged the cage 22 having the openings 24 and 26 with the valve seats 28 and 30. The valves 32 and 34 are connected by a post 36.

In the upper part of the valve 32 is a socket 38 into which is screwed the stem 40 on which adjacent to the socket 38 is a lock nut 42.

The upper part of the valve body 10 has an opening 44 and extending upwardly from the opening is a tubular member or distance piece 46, which has the flange 48 mounted on the body 10 by means of the cap screws 50. The distance piece has an upper end or top member 52 provided with the hole 54 through which the stem loosely extends, as shown in Figure 2.

The distance piece 46 has at its upper part a peripheral flange 56.

Seated on the distance piece 46 is a cylinder 58 closed at its upper end as at 58ª, and having at its lower end a peripheral flange 60 secured to the flange 56 by bolts 62 and nuts 64.

Screwed onto the upper end of the stem 40 within the cylinder 58 is a piston head 66. Received on the stem 40 on both sides of the piston head 66 are the piston cups 68 of leather or the like, held in place by follower nuts 70 and 72 screwed onto the stem 40. The upper follower nut 72 has the upwardly projecting travel stops 74.

In the upper part of the cylinder 58 is a partition 76 through which extends a threaded opening 78 into which is screwed a reduced plug 80 having extending therethrough a passage 82 for affording communication between the space above and the space below the partition 76.

For convenience sake, I have called that portion of the cylinder 58, which receives the piston, the piston chamber A and have called that portion of the cylinder 58 above the partition 76 the supply chamber B.

A tubular bushing 86 is mounted in the top 58ª of the cylinder 58 and is connected preferably by a T 88 with the pipe 90 leading for instance from the intake pipe 18 as shown in Figure 2.

The pipe 90 should be connected with the pressure line on the intake side of the valve.

In the pipe 90 is a suitable strainer 92, the structure of which is not herein further referred to.

In the pipe 90 between the T 88 and the intake pipe 18 is a valve casing 94 in which is arranged a needle valve 96 for controlling fluid flow through the casing 94. The stem 98 of the needle valve 96 projects from the casing 94 and has the head 100, which ordinarily is adjusted to leave the valve 96 barely unseated.

Arranged in the pipe 90 is a valve casing 102 in which is the seat 104, with which the valve 106 coacts. A pipe 108 communicates with the casing 102 and may, if desired, be arranged to discharge into the discharge passage 20. The casing 102 is made in two parts C and D bolted together, so that they may be taken apart if desired. The seat 104 is in the casing part D.

Into the closed end of the casing member 102, there is screwed an adjustable spring tension plug 112, which has on its inner end a spring seat 114. The stem 116 of the valve 106 projects slidingly into the spring seat 114 in the plug 112. The coil spring 118 is mounted on the stem 116 between the valve 106 and the seat 114. The plug 112 may be adjusted inwardly or outwardly for regulating the tension on the spring 118.

The outer end of the valve casing member C is slightly reduced and externally screw-threaded to receive a cover cap 120 for the outer end of the plug 112, which is closed.

I will now briefly explain the operation of my improved automatic relief valve.

Assuming that the intake passage 18 is connected with a pressure line and that it is desired to maintain therein a pressure for instance of one hundred pounds, that the valve 96 is cracked, and that the tension on the spring 118 has been adjusted in the proper manner, then it will be seen that steam, for example, will pass into the valve casing 10 through the distance piece 46 and the passage 54 into the cylinder 58 below the piston 66.

Pressure will also pass through the pipe 90 past the strainer 92 and the valve 96 into the supply chamber B and thence through the passage 82 to the upper part of the cylinder 58 above the piston therein, thereby equalizing the pressure on opposite sides of the piston.

When that condition exists, the spring 122 on the stem 40 between the lock nut 42 and the member 52 will hold the valves 32 and 34 seated.

The pressure will also flow into the valve casing member D.

Assuming that the spring 118 is set properly, it will be understood that it would take a little over one hundred pounds of pressure to unseat the valve 106.

After the pressure on the piston 66 is equalized, then the valves 32 and 34 will remain seated until the pressure in the line connected with the intake 18 rises above one hundred pounds, which we have assumed to be that for which the valve is set.

When the pressure becomes a little greater than one hundred pounds, the valve 106 will be opened, whereupon the pressure in the chamber B and the upper part of the cylinder 58 will be reduced until steam can move past the slightly open valve 96.

As soon as the pressure above the piston 66 is substantially less than the pressure below, the pressure on the under side of the piston 66 will raise the piston and open the valves 32 and 34 for allowing steam under pressure to pass those valves.

When the pressure in the pressure line drops to one hundred, the valves 32 and 34 will again be closed.

As a matter of fact, the device is ordinarily set so that when there is a steady increase of pressure in the pressure line tending to raise that pressure over the assumed one hundred pounds, the valves 32 and 34 will practically float for maintaining pressure in the main line at one hundred and allowing any surplus pressure to escape past the main valve.

An evil that commonly exists under such circumstances is the chattering or pounding of the valve or valves. This chattering or pounding is avoided in the present case by the arranging of the piston 66 in a cylinder with restricted lower and upper outlets, so that the movement of the piston 66 is always cushioned, and there is no tendency for the valve to open or close with a pounding movement.

The use of the valve 106 similar to the ordinary poppet valve and capable of tension adjustment affords a simple and easy method for controlling the valves 32 and 34, and a means which will not quickly get out of order by wear or otherwise.

It will be seen that I can secure quite an accurate control and variation of my device by adjusting the plug 112.

It will be observed also that another variation control is afforded by the use of the member 80 which may be removed for permitting the substitution of a similar member with a passage 82 of a different size.

It will, of course, be understood that changes may be made in the details of the construction and arrangement of parts of my improved relief and safety valve without departing from the real spirit of my invention, and it is my purpose to cover by my claims any modified forms of structure or use of mechanical equivalents, which may be reasonably included within their scope.

I claim as my invention:

1. A relief valve comprising a valve casing having inlet and outlet passages, a valve for controlling fluid flow between said passages, a cylinder, a piston therein, said piston being operatively connected with said valve, said cylinder having communication with the valve casing on the intake side by means of a restricted passage, a reserve chamber connected with said cylinder on the opposite side of the piston from said first-named restricted passage by a second restricted passage, a pipe communicating with the intake passage and with said reserve chamber having therein an adjustable valve for affording a finely restricted passage, and a passageway means of communication between said reserve chamber and the outlet side of said first named valve and an adjustable, pressure-opened regulating valve in said last named passageway for controlling the relief action of said first named valve.

2. A relief valve comprising a valve casing having inlet and outlet passages, a valve for controlling fluid flow between said passages, a cylinder in said casing, a piston operatively connected with said valve, said cylinder having communication with the valve casing on the intake side by means of a restricted passage, a reserve chamber connected with said cylinder on the opposite side of the piston from said first-named restricted passage by a second restricted passage, a pipe communicating with the intake passage and with said last-named chamber having therein an adjustable valve for affording a finely restricted passage, and a valve in said pipe on the opposite side of the pipe connection with said last chamber from the second-described valve, said last-described valve being spring-controlled for regulating flow from said pipe, the passage from said last-described chamber into said cylinder being formed in a removable member.

Des Moines, Iowa, April 18, 1927.

LYLE W. BROWNE.